A. HAYES.
METHOD OF MAKING MOTOR FUEL.
APPLICATION FILED JULY 14, 1919. RENEWED OCT. 16, 1920.
1,378,858.  Patented May 24, 1921.
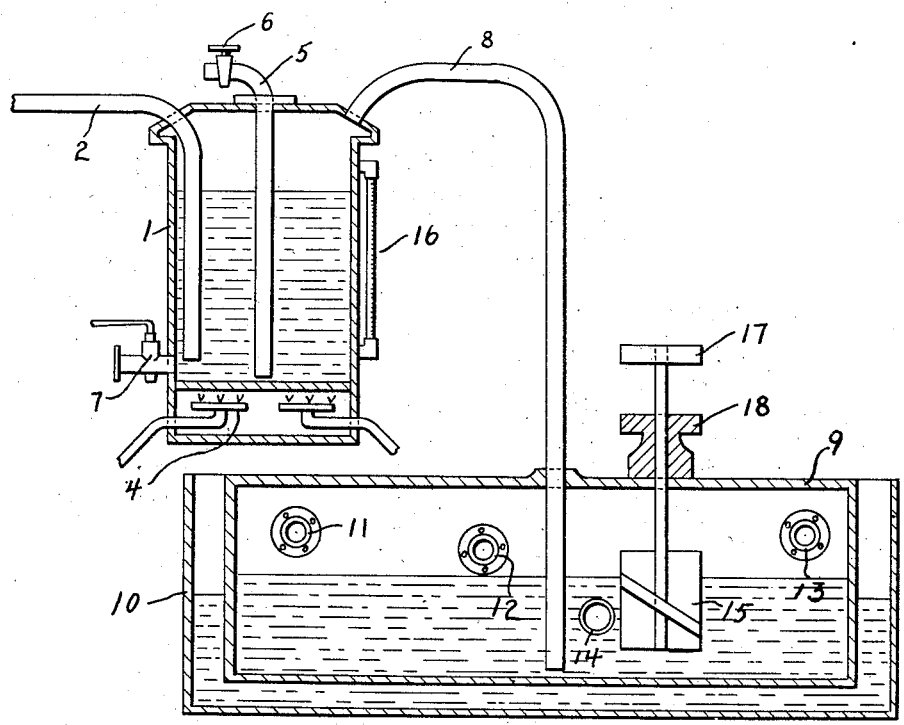
Inventor
Albert Hayes
By A. P. Gridley
Attorney

UNITED STATES PATENT OFFICE.

ALBERT HAYES, OF NEW YORK, N. Y., ASSIGNOR, BY MESNE ASSIGNMENTS, TO U. S. INDUSTRIAL ALCOHOL CO., A CORPORATION OF WEST VIRGINIA.

METHOD OF MAKING MOTOR-FUEL.

1,378,858.      Specification of Letters Patent.      Patented May 24, 1921.

Application filed July 14, 1919, Serial No. 310,536. Renewed October 16, 1920. Serial No. 417,480.

*To all whom it may concern:*

Be it known that I, ALBERT HAYES, a citizen of the United States, residing at New York, in the county of New York, State of New York, have invented certain new and useful Improvements in Methods of Making Motor-Fuel, of which the following is a description, reference being had to the accompanying drawings, forming a part hereof.

My invention relates to a method of making a motor fuel having as its principal ingredients kerosene or other relatively heavy hydrocarbon, and alcohol and my invention has for its object to provide a method by which the kerosene or other relatively heavy hydrocarbon and the alcohol may be brought into such complete and perfect combination that there will be no separation or stratification however long the compound may be kept. A further object of my invention is to provide a method by which the necessity of denaturing the alcohol used in making the compound may be avoided without conflicting with the laws relating to the manufacture of alcohol for industrial purposes.

With the above indicated objects and other objects hereinafter explained in view my invention consists in the method hereinafter described and claimed.

The drawing is a diagrammatic view of an apparatus adapted to carry out my method it being, of course, understood that the drawing is illustrative only and is not intended to limit the invention to the use of the particular apparatus shown or to any particular apparatus.

It is well known that the supply of the lighter hydrocarbons such as gasolene is so far insufficient to meet the demands for use in explosion engines that a satisfactory substitute has been extensively sought for. It has been found that kerosene and other relatively heavy hydrocarbons are capable of use but only under special conditions and that alcohol is in some respects adapted for use as a motor fuel but only under special conditions. It has also been considered that if kerosene could be combined with alcohol so as to form a stable, non-stratifying compound the result would be a satisfactory motor fuel. But it has been found that kerosene and alcohol will not combine in anything like or even approaching equal quantities under ordinary circumstances or, so far as I am informed, under any circumstances up to the discovery which is the basis of my present invention. I have discovered that while alcohol will not mix with untreated kerosene, it is possible by first treating the kerosene with a small quantity of ether and then adding a somewhat larger quantity of benzol, to produce a mixture, the principal component of which is kerosene, with which alcohol will readily mix to form a stable, non-stratifying compound, particularly if the alcohol is added slowly, in which the alcohol will form a substantial proportion of the whole.

In carrying out my invention I take about 50 parts of kerosene, preferably low grade kerosene on account of its low cost, and add to it about 3 parts of ether and mix thoroughly. To this mixture I add about 20 parts of benzol and mix thoroughly. These components combine readily to form a clear liquid. Into this liquid I gradually introduce alcohol and in order to insure the gradual introduction of the alcohol I find it desirable to introduce it as vapor keeping the liquid cool so that the alcohol vapor as it comes in contact with the liquid condenses thus combining gradually but in a continuous stream. By producing this alcohol vapor by distilling the alcohol from an alcohol carrying mixture such as the fermented material from which alcohol is usually distilled and leading the vapor directly into the cooled liquid described, preferably agitating so as to bring all of the liquid into contact with the alcohol vapor as it is condensed. The alcohol combines at once with the liquid and, as the liquid is mainly composed of kerosene and benzol the compound formed is not capable of use as a beverage and the alcohol is in effect denatured. The necessity of denaturing the alcohol which would be required if the alcohol were separately produced, is thus avoided.

The drawing shows an apparatus adapted for carrying out the method above described. In the drawing 1 indicates the alcohol still having an inlet pipe 2 for admitting the fermented or other alcohol carrying liquid from which the alcohol is to be distilled, and having outlet pipe 8 from its top for carrying off the alcohol vapors as they are produced by the action of the heat from burners 4. The still is preferably provided with blow off tube 5 controlled by valve 6 and with draw off cock 7 and gage glass 16.

The compound of kerosene, ether and benzol to which the alcohol is to be added is contained in a tank 9, preferably closed to prevent any escape of alcohol vapors, and the pipe 8 extends into this tank preferably to near its bottom. The tank is preferably cooled by a water jacket 10, and is provided with suitable inlets 11, 12, and 13 for admitting the kerosene, ether and benzol and with a stirrer or agitator 15 of any usual construction the shaft of which extends up through a bearing 18 and has a pulley 17 for rotating it.

The proportions of ether and benzol to 50 parts of kerosene above stated is approximate only, and these proportions may be varied somewhat but not less than 3 parts of ether should be used. The proportion of benzol may be considerably less than 20 parts and the proportion of alcohol may be considerably greater than 27 parts and still result in the production of a clear, stable, non-stratifying liquid but the proportions stated result in a liquid fuel having a flash point sufficiently low to permit of its use in an ordinary carbureter and any change in the proportions would be likely to vary the flash point.

I do not herein claim the motor fuel produced by the herein described method as that forms the subject-matter of a separate application for patent filed by me on August 27, 1919, Serial No. 320,254.

Having thus described my invention what I claim is:

1. The herein described method of combining alcohol with kerosene to form a stable, non-stratifying compound adapted for use as a motor fuel which consists in adding ether to the kerosene, then adding benzol to the kerosene and ether, and finally adding the alcohol slowly to the mixture of kerosene, ether and benzol.

2. The herein described method of combining alcohol with kerosene to form a stable, non-stratifying compound adapted for use as a motor fuel which consists in adding ether to the kerosene, then adding benzol to the kerosene and ether, producing alcohol vapors from an alcohol carrying material and discharging the alcohol vapors into the mixture of kerosene, ether and benzol.

3. The herein described method of combining alcohol with kerosene to form a stable, non-stratifying compound adapted for use as a motor fuel which consists in adding ether to the kerosene in approximately the proportions of 3 parts of ether to 50 parts of kerosene, then adding approximately 20 parts of benzol to the kerosene and ether, maintaining the mixture thus formed at a relatively low temperature, producing alcohol vapors from alcohol carrying material and discharging the alcohol vapors into the mixture of kerosene, ether and benzol to cause the alcohol vapors to be condensed by said mixture and to be taken up thereby as they are produced and discharged into it, and continuing the production and condensation of the alcohol vapors until approximately 27 parts of alcohol have been added to the mixture.

In testimony whereof I affix my signature this 14th day of July 1919.

ALBERT HAYES.